United States Patent Office 3,792,184
Patented Feb. 12, 1974

3,792,184
FREEZING AND THAWING PROCESS FOR REMOVING PRECIPITATING SUBSTANCES FROM PLANT EXTRACTS
Kaoru Inagami and Hidemoto Kamada, Tokyo, Japan, assignors to The Calpis Food Industry Co., Ltd., Tokyo, Japan
No Drawing. Filed Nov. 4, 1971, Ser. No. 195,636
Claims priority, application Japan, Nov. 14, 1970, 45/100,313
Int. Cl. A23l 1/28
U.S. Cl. 426—369    4 Claims

ABSTRACT OF THE DISCLOSURE

Plant extracts (such as extracts from cocoa powder or cinnamon powder) which contains colloidal particles have the undesirable precipitating substances therein (such as proteins or high polymer carbohydrates) removed by freezing the extract to $-12°$ C. or lower and then raising the temperature to $5°$ C. to thaw the extract, the pH of the extract being between 3 and 5. The precipitate is then removed by filtering or centrifuging the extract.

---

The present invention provides a process for rapidly removing precipitating substances from plant extracts by the freezing and thawing treatment and intends to remove useless precipitating substances coexisting with useful ingredients in plant extracts with the object of producing clear and stable extracts and further making easier the industrial production of liquid medicines and beverages with an excellent keeping quality.

Plant extracts produced by boiling or pressing usually contain those substances which are difficult to remove effectively and easy to form precipitates like proteins, glucoproteins and high polymer carbohydrates in tiny colloidal particles. These substances are often extracted together with useful ingredients depending on the methods and conditions of extraction, such as extracting solvents, temperature and pH. Those substances, as it is often experienced, cause the extracts to become turbid or precipitate when the extracts are allowed to stand. Several methods of making the extracts clear and stable, have been developed, including still standing, salting-out, concentration-filtering, use of fining agents, ultra-filtration and separation by centrifugation. But, the still standing method requires a long time, the salting-out needs desalting procedure, and the process which employs repeated concentration and filtration is not only tedious but apt to result in loss of useful ingredients and the flavor peculiar to the extracts.

In processes using such fining agents as acid clay, active carbon, diatom earth, alumina and filter paper, useful ingredients are also absorbed to some extent. Naturally, it would be better to avoid adding these matters to the extracts. Dialysis and ultra-filtration can by no means be considered beneficial because of the difficulty in procuring stable filtrating membranes and maintaining a high efficiency in filtration.

After investigating techniques of fining plant extracts, the present inventors found that the freezing and thawing treatment is most suitable for removing rapidly and effectively precipitating substances in colloidal particles, without losing useful ingredients contained in the extracts and the flavor peculiar to the extracts.

When the plant extract which is a colloidal liquid is frozen, the water is frozen, and simultaneously dehydration occurs around the colloidal particles, which results in the coagulation of proteins or high polymer carbohydrates dispersed in the extract due to formation of hydrogen bond and intermolecular force between the colloidal particles. Consequently, therefore, if the frozen matters are thawed and treated simply by centrifugation or filtration, the precipitating substances can be easily removed without adding any colloidal coagulator or fining agent and without heating. However, plant extracts contain those colloidal particles which cannot easily be coagulated by freezing. They can be removed by freezing slowly so as to form a coagulated mass of colloidal particles, followed by rapid thawing and centrifugation conducted at as low a temperature as possible, so that the mass of colloidal particles is removed from the extract before it is broken into smaller particles.

In practice, the freezing temperature should be determined in accordance with the concentration of extracts and remaining amount of solvent added in the extraction process, and depending on the nature of colloidal particles existing in the extracts to be treated. It is often necessary to adjust and maintain several freezing conditions, including pH and temperature, in order to remove precipitating substances efficiently. And, for some plant extracts, it is effective to alter freezing temperature in order to remove precipitating substances.

The effect of this invention will be illustrated by the following examples.

Experiment 1

To 400 g. of defatted cocoa powder was added 4 liters of a 50% by volume aqueous solution of ethyl alcohol and the mixture was subjected to extraction for one hour at $55°$ C. with shaking. The extract obtained was filtered with a 10-mesh Saran cloth, and the filtrate was allowed to stand for a day at $20°$ C., centrifuged at 3000 r.p.m. for 5 min., and then concentrated to 400 g. under a reduced pressure with a rotary evaporator at a temperature below $40°$ C. By centrifuging the concentrate for 10 min. at 3000 r.p.m., a supernatant liquid was separated.

The supernatant liquid was cooled down to $-15°$ C. in 2 hours and kept frozen at the same temperature for 15 hours, and then raised up to $5°$ C. in 110 min. Immediately, the liquid at pH 5 was centrifuged at 3000 r.p.m. for 5 min. at $5°$ C. The precipitate obtained by the process was dried and weighed.

The effect of this invention was more remarkably observed when the pH value of the supernatant liquid was made lower than 5.0 with aqueous solution of hydrochloric acid.

The results are shown in Table 1 together with references (control) in which cooling at $5°$ C. was continued for 17 hours and the centrifuged precipitate was dried and weighed. The weight in mg. represents the amount of the precipitate per 10 g. extract.

TABLE 1

| pH | Reference,[1] mg. | This invention,[2] mg. |
|---|---|---|
| 5.0 | 80 | 500 |
| 4.0 | 110 | 610 |
| 3.0 | 105 | 630 |

[1] Cooling at $5°$ C.
[2] Freezing at $-15°$ C. and thawing.

The precipitate obtained in this experiment did not have the cocoa flavor and was considered, by the elemental analysis, to be high polymer carbonydrate or polyphenol.

Experiment 2

To 400 g. of cinnamon powder was added 2 liters of a 70% by volume aqueous solution of ethyl alcohol and the mixture was subjected to extraction for 3 hours at $55°$ C. with shaking and then allowed to stand for 12 hours at $20°$ C. The liquid was filtered with a 100-mesh Saran cloth, and after that, the same process as Experiment 1 was employed to prepare the desired extract.

The cinnamon extract obtained was divided into two portions. One of them was cooled down to −12° C. in 2 hours and the other to −30° C. These respective temperatures were maintained for 4, 20, 100 and 240 hours. Then they were thawed by raising the temperature up to 5° C. in 2 hours, and immediately centrifuged at 3000 r.p.m. for 5 min. at the temperature 5° C. The precipitate was separated, dried and weighed as shown in Table 2.

In the table, the amount of the precipitate is expressed in mg. per 10 g. of extract. The precipitates obtained in this experiment did not have the cinnamon flavor and were considered, by the elemental analysis, to be high molecular carbohydrate or polyphenol.

TABLE 2

| Keeping time (hours) | Reference,[1] mg. | This invention,[2] mg. Freezing at— | |
|---|---|---|---|
| | | −12° C. | −30° C. |
| 4 | 11 | 31 | 37 |
| 20 | 13 | 35 | 44 |
| 100 | 13 | 46 | 45 |
| 240 | 18 | 50 | 62 |

[1] Cooling at 5° C.
[2] Freezing and thawing.

What is claimed is:

1. A process for removing recipitating substances from a plant extract containing colloidal particles without adding a fining agent to the extract, which comprises freezing the plant extract to −12° C. or lower, raising the temperature of the frozen extract to no higher than 5° C. to thaw the extract, and removing precipitates from the thawed extract.

2. The process as claimed in claim 1 wherein the pH value of the plant extract is adjusted to 3–5.

3. The process as claimed in claim 1 wherein the precipitates are removed from the thawed extract by centrifuging the extract.

4. The process as claimed in claim 1 wherein the precipitates are removed from the thawed extract by filtering the extract.

References Cited

UNITED STATES PATENTS 2,287,444  6/1942  Mergenthaler _____ 99—26 X

FOREIGN PATENTS 844,451  8/1960  Great Britain.

ROBERT L. LINDSAY, Jr., Primary Examiner

R. H. TUSKIN, Assistant Examiner

U.S. Cl. X.R.

210—42; 426—478, 524